April 26, 1960 R. E. MOULE 2,933,758
APPARATUS FOR PRODUCING ARTICLES SUCH AS
SKINLESS FRANKFURTERS
Filed Nov. 21, 1956 2 Sheets-Sheet 1
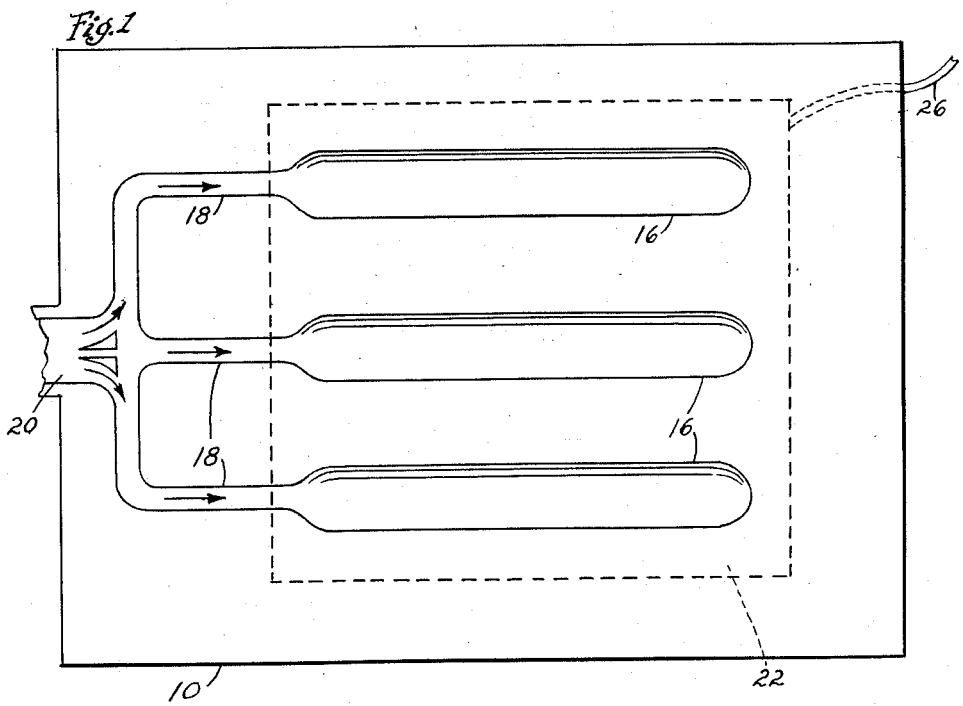
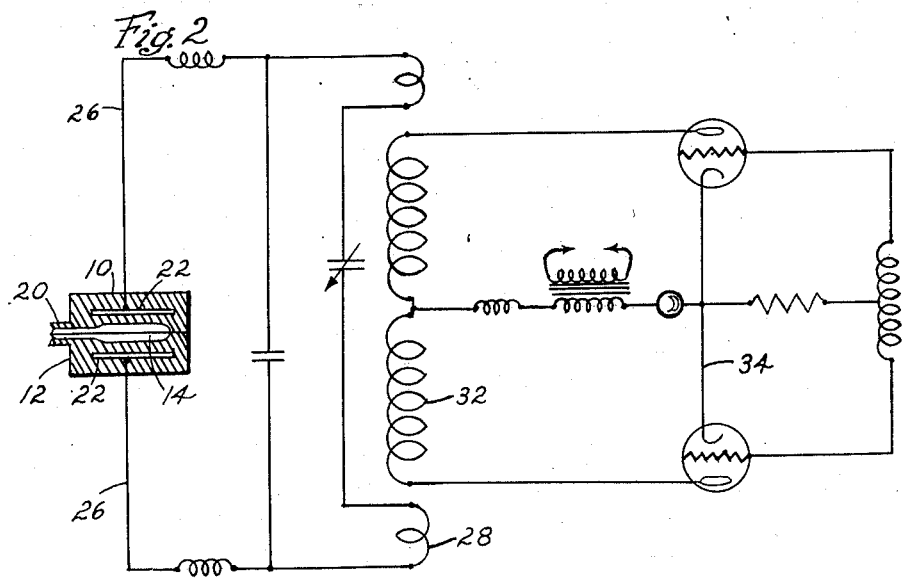
INVENTOR.
Rex E. Moule
BY Chas. R. Fay,
atty.

April 26, 1960   R. E. MOULE   2,933,758
APPARATUS FOR PRODUCING ARTICLES SUCH AS
SKINLESS FRANKFURTERS
Filed Nov. 21, 1956   2 Sheets-Sheet 2
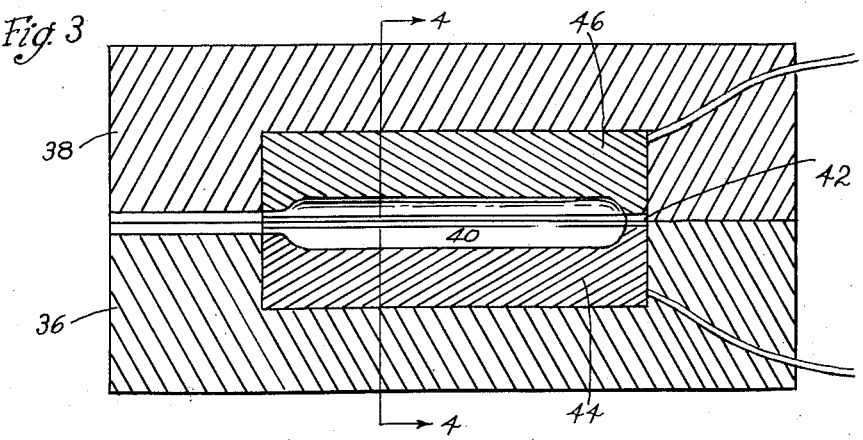
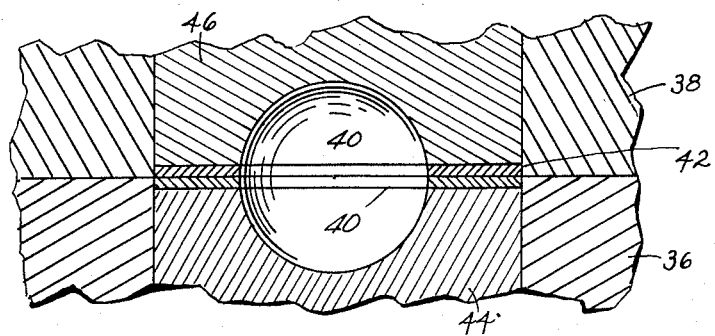
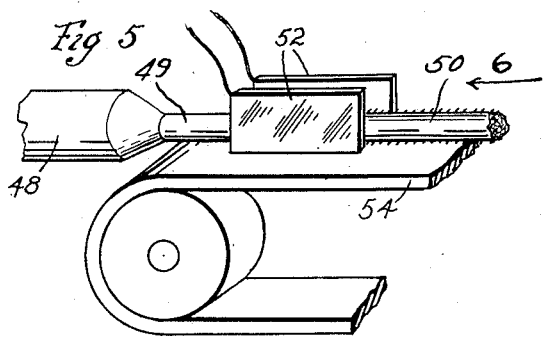
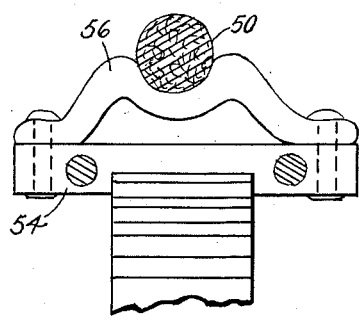
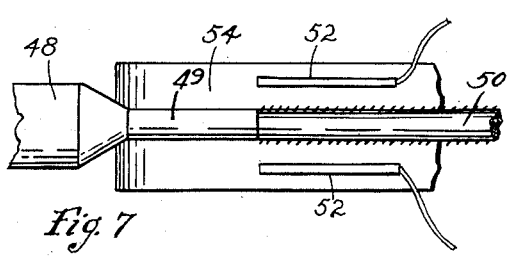
INVENTOR.
Rex E. Moule
BY Chas. R. Fay,
atty.

United States Patent Office 2,933,758
Patented Apr. 26, 1960

2,933,758

APPARATUS FOR PRODUCING ARTICLES SUCH AS SKINLESS FRANKFURTERS

Rex E. Moule, Holden, Mass.

Application November 21, 1956, Serial No. 623,664

3 Claims. (Cl. 17—32)

This invention relates to a new and improved apparatus for the high-speed production of skinless frankfurters or other articles from a mash and directly without the use of any preliminary or intermediate covering or skin of any kind. The invention applies to other food and non-food products as well, and is not limited to frankfurters.

The principal object of the invention resides in the provision of such a frankfurter, etc.; the provision of a skinless frankfurter etc. which may be made and processed in rapid production; the provision of apparatus and method providing for the molding of frankfurters, etc. from a prepared flowable or semi-fluid material or mash containing the ingredients of the frankfurters; the provision of an apparatus for molding and processing the frankfurters at the same time by heating the frankfurters to a temperature suitable for a solidifying the same by the use of high-frequency electric current which may be provided by apparatus incorporated directly in a mold of relatively low di-electric resistance for making the frankfurters; or which may be provided in apparatus processing the frankfurters, and subsequent to the molding operation, resulting in either event in completely finished skinless frankfurters in condition ready for sale.

Other objects and advantages of the invention will appear hereinafter.

Reference is to be had to the accompanying drawings, in which

Fig. 1 is a view of a part of a mold in which the frankfurters are made and heated;

Fig. 2 is a longitudinal section on a reduced scale through the complete mold;

Fig. 3 is a longitudinal section through the mold illustrating a modification;

Fig. 4 is a section on an enlarged scale on line 4—4 of Fig. 3;

Fig. 5 is a fragmentary perspective view illustrating a modified method of molding the frankfurters and heating the same;

Fig. 6 is an enlarged modified view in elevation, partly in section, looking in the direction of arrow 6 in Fig. 5; and Fig. 7 is a plan view of the apparatus shown in Fig. 5.

In carrying out the present invention, the same may be illustrated as involving the use of a mold which may conveniently comprise a molding plate or block 10 of material having a complementary molding plate or block 12 for cooperating therewith somewhat in the manner of molds used in the plastic injection molding industry. The two mold plates 10 and 12 together provide a cavity 14 which is formed in the desired shape of the frankfurter or other article and part of which is formed in each mold plate as indicated at 16 in Fig. 1.

There may be as many cavities as desired and each cavity is provided with an inlet generally indicated at 18, these coming together at the sprue 20 represented as deriving the material directly from an injection molding machine or some convenient device for inserting the semi-fluid material or mash into the molds, so that the articles are formed to the shape shown. Of course after the frankfurters etc. are processed, the gates or sprues which are formed in the passages 18 are cut off. Any means may be used for providing the pressure by which the molds are filled with the material.

As shown in Figs. 1 and 2, there is provided as for instance in each mold block 10 and 12, an electrode or plate, these being indicated at 22.

The plates are in turn connected across the secondary 30 of a transformer 26, which transformer has a primary 28 connected as shown in the diagram to a tube circuit 34 capable of inducing high-frequency current across the plates 22. Preferably, the frequency of the current passing between plates is maintained on a high order of frequency in the neighborhood of 50 megacycles as an example.

The di-electric resistance of the material in the molds produces heat to the desired temperature for rendering the same more solid and in a condition to permanently retain the shape of the frankfurters in individual elements without the need for having any skin around the same. When the frankfurters, etc. have been thus heated for a very short period of time, the mold may be opened and the frankfurters etc. abstracted in a manner comparable to that used in the molding industry for plastics and other materials. The heat may of course be controlled to any desired degree such as may be necessary to cook the articles if they are food products but in any event to solidify the formed materials or mash to a solid enough state where they will maintain their own shape when cooled, and this is true whether the articles are of food or non-food nature.

As shown in Figs. 3 and 4, there are a pair of mold plates 36 and 38 having the cavities 40 therein as before but in this case the cavities are embedded directly in the mold plates and themselves form the mold cavity, so that there is no necessity for the high frequency induced current passing through the material of the mold as is shown in Fig. 2. However, in the case of Figs. 3 and 4, it is of course necessary to provide a circumferential insulator means as at 42 between the electrodes 44 and 46. Figs. 3 and 4 merely illustrate a slightly different apparatus from that shown in Figs. 1 and 2 and it is to be understood that the skinless frankfurters or other articles may be formed and heated in many different ways without departing from the scope of the invention.

Another way in which the articles may be formed and processed is to provide a tank or hopper having a nozzle 48 with pressure means forcing the semi-fluid ingredients or mash therefrom resulting in an endless length of uncooked frankfurter 50. This is then passed between a pair of high-frequency electrode plates 52 more or less as above described with reference to Fig. 2. This results in heating the ingredients and forming the skinless endless length of frankfurter or other material which may then be severed in any desired lengths.

It is necessary to provide a support such as a traveling belt 54 for the purpose of supporting the advancing frankfurter strip and in some cases it is preferable to provide a shaped top surface such as shown at 56 wherein the conveyor is provided with a concaved upper surface in which the formed material may rest while the shape thereof is maintained during heating.

Having thus described my invention and the advantages thereof, I do not wish to be limited to the details herein disclosed, otherwise than as set forth in the claims, but what I claim is:

1. An apparatus of the character described comprising mold means including a pair of complementary mold members, each member having therein a mold cavity, so that when the molds are in abutting position the cavities will form a complete mold conforming to the desired shape, material feeding means communicating with the cavities in the mold for feeding material to the mold, and electrode means associated with the mold members for providing a high frequency induced electric current to pass through the product ingredients in the cavity to heat the same sufficiently to set the ingredients and form a solid product.

2. An apparatus of the character described comprising mold means including a pair of complementary mold members, each member having therein a mold cavity, so that when the molds are in abutting position the cavities will form a complete mold conforming to the desired shape, material feeding means communicating with the cavities in the mold for feeding material to the mold, and electrode means associated with the mold members for providing a high frequency induced electric current to pass through the product ingredients in the cavity to heat the same sufficiently to set the ingredients and form a solid product, said electrode means being connected to the mold members.

3. An apparatus of the character described comprising mold means including a pair of complementary mold members, each member having therein a mold cavity, so that when the molds are in abutting position the cavities will form a complete mold conforming to the desired shape, material feeding means communicating with the cavities in the mold for feeding material to the mold, and electrode means associated with the mold members for providing a high frequency induced electric current to pass through the product ingredients in the cavity to heat the same sufficiently to set the ingredients and form a solid product, said electrode means being embedded in the mold members.

References Cited in the file of this patent
UNITED STATES PATENTS

| | | |
|---|---|---|
| 2,054,937 | Kremer | Sept. 22, 1936 |
| 2,107,931 | Brown | Feb. 8, 1938 |
| 2,401,991 | Walton et al. | June 11, 1946 |
| 2,623,451 | Prohaska | Dec. 30, 1952 |
| 2,651,808 | Burnett et al. | Sept. 15, 1953 |
| 2,685,518 | Prohaska | Aug. 3, 1954 |
| 2,685,833 | Hagopian | Aug. 10, 1954 |
| 2,698,960 | Cross | Jan. 11, 1955 |